(12) United States Patent
Reitberger

(10) Patent No.: US 7,055,624 B2
(45) Date of Patent: Jun. 6, 2006

(54) GUIDE RAIL SYSTEM FOR A POWER TOOL

(75) Inventor: Rudolf Reitberger, Munich (DE)

(73) Assignee: Hilti Aktiengesellschaft, Schaan (LI)

(*) Notice: Subject to any disclaimer, the term of this patent is extended or adjusted under 35 U.S.C. 154(b) by 185 days.

(21) Appl. No.: 10/766,242

(22) Filed: Jan. 27, 2004

(65) Prior Publication Data

US 2005/0011679 A1    Jan. 20, 2005

(30) Foreign Application Priority Data

Jan. 27, 2003    (DE) ............................... 103 03 008

(51) Int. Cl.
*E21B 7/26* (2006.01)
(52) U.S. Cl. ........................ 175/20; 175/220
(58) Field of Classification Search ............ 175/20, 175/220
See application file for complete search history.

(56) References Cited

U.S. PATENT DOCUMENTS

| 2,023,027 | A | * | 12/1935 | Mitchell | 173/33 |
| 2,393,230 | A | * | 1/1946 | Bradshaw | 30/168 |
| 3,136,372 | A | * | 6/1964 | Roach | 172/41 |
| 2001/0052429 | A1 | * | 12/2001 | Frenzel et al. | 175/210 |
| 2003/0221868 | A1 | * | 12/2003 | Martin | 175/20 |

\* cited by examiner

*Primary Examiner*—William Neuder
(74) *Attorney, Agent, or Firm*—Abelman, Frayne & Schwab

(57) ABSTRACT

A guide rail system (1) for a power tool (2), has at least two axially extending guide rails (3, 3'), at least one guide slide (4, 4') displaceable on the guide rails (3, 3') having a coupling part (5a, 5b) for securing the power tool (2), a base plate (6) with a rail coupling part (7a, 7b) and a rail junction (8) displaceable on one of a guide rails (3) relative to the other guide rail (3'), wherein the rail junction (8) has a coupling part (5a, 5b).

6 Claims, 2 Drawing Sheets

GUIDE RAIL SYSTEM FOR A POWER TOOL

BACKGROUND OF THE INVENTION

The invention relates to a guide rail system for a guide rail for mounting a power tool, in particular a swiveling rail junction for a core drill.

The high torque and feed pressures required for drilling a core in rock are usually provided by mounting the power tool on a machine stand, which is solidly connected with a base surface. Accordingly, the forces of the power tool are transferred via an adjustable guide slide formed with a coupling part to the central fastening of the power tool, symmetrically on a guide rail and further via a base plate on the base surface. For performing the different core boring variations, especially those required in mining operations, the operator requires on site a universal combined rail system comprised of basic components, made up of, in particular, at least two guide rails and at least one base plate each with a rail coupling part, a guide slide with a tool coupling part and a rail junction and, if required, complemented with individual basic components.

According to DE 4011042 a guide rail system for a power tool has a pivotally adjustable rail junction that is laterally displaceable relative to a first guide rail. By virtue of the lateral arrangement, that is, non-symmetrical relative to the surface inertial axis of the guide rail, a second guide rail mounted using the rail junction, the high torques and feed pressures cause undesirable torsion within the first guide rail connected with the base material being worked. In addition, the pivotal rail branch point, which itself is displaceable like a guide slide, is formed very high in mass.

SUMMARY OF THE INVENTION

The primary object of the invention is to provide a guide rail system that is rigid to torsion for use in mounting a power tool. A further object is in the reduction of the mass of the different basic components of the rail system.

A guide rail system for a power tool formed of at least two guide rails is comprised of at least one guide slide that is displaceable on the guide rail with a coupling part for securing the power tool, a base plate with a rail coupling part and a rail branch point, a rail junction displaceable on a guide rail relative to the other guide rail, wherein the rail branch has a coupling part.

Because the rail junction has a tool coupling part, the rail junction can be fastened to the associated tool coupling part of a guide slide and consequently is always central; that is, connected to the guide rail symmetrically to the surface inertial axis, whereby no torsion forces occur. In addition, the only one coupling part for fastening to a displaceable guide slide forming a rail branch relative thereto is laid out modularly with a guide slide and, accordingly is configured low in mass. The rail branch via the coupling part in the form of an adapter is suspended in a conventional guide slide, when converting the rail system with or without a rail branch for fastening of the power tool requires no change in the guide slide.

Advantageously, the rail branch has a rail coupling part, whereby any number of guide rails can be combined with it in place.

Advantageously, the rail branch is configured fixedly pivotally displaceably in the rail coupling part, whereby the rail system is universally implementable.

Advantageously, the rail coupling part of the rail branch corresponds to the rail coupling part of the base plate, whereby a guide rail can be optionally combined with the rail branch or with the base plate.

Advantageously, the rail coupling part is configured as a transverse cylinder, which is inserted at the ends thereof in fastening lugs, whereby with an associated end coupling part of the guide rail in the form of a transversely situated cylinder bore, a terminal torsionally stiff, transversely pivotally articulation can be formed.

Advantageously, the end coupling part of the guide rail arranged transverse to the cylinder is formed as a slotted cylinder bore arranged transversely, which can be clamped in the slot area using a locking screw, whereby a clearance-free and friction-locking secure articulation can be formed.

BRIEF DESCRIPTION OF THE INVENTION

The invention will be more completely described with reference to an exemplary embodiment, wherein.

DETAILED DESCRIPTION OF THE INVENTION

Figure 1:
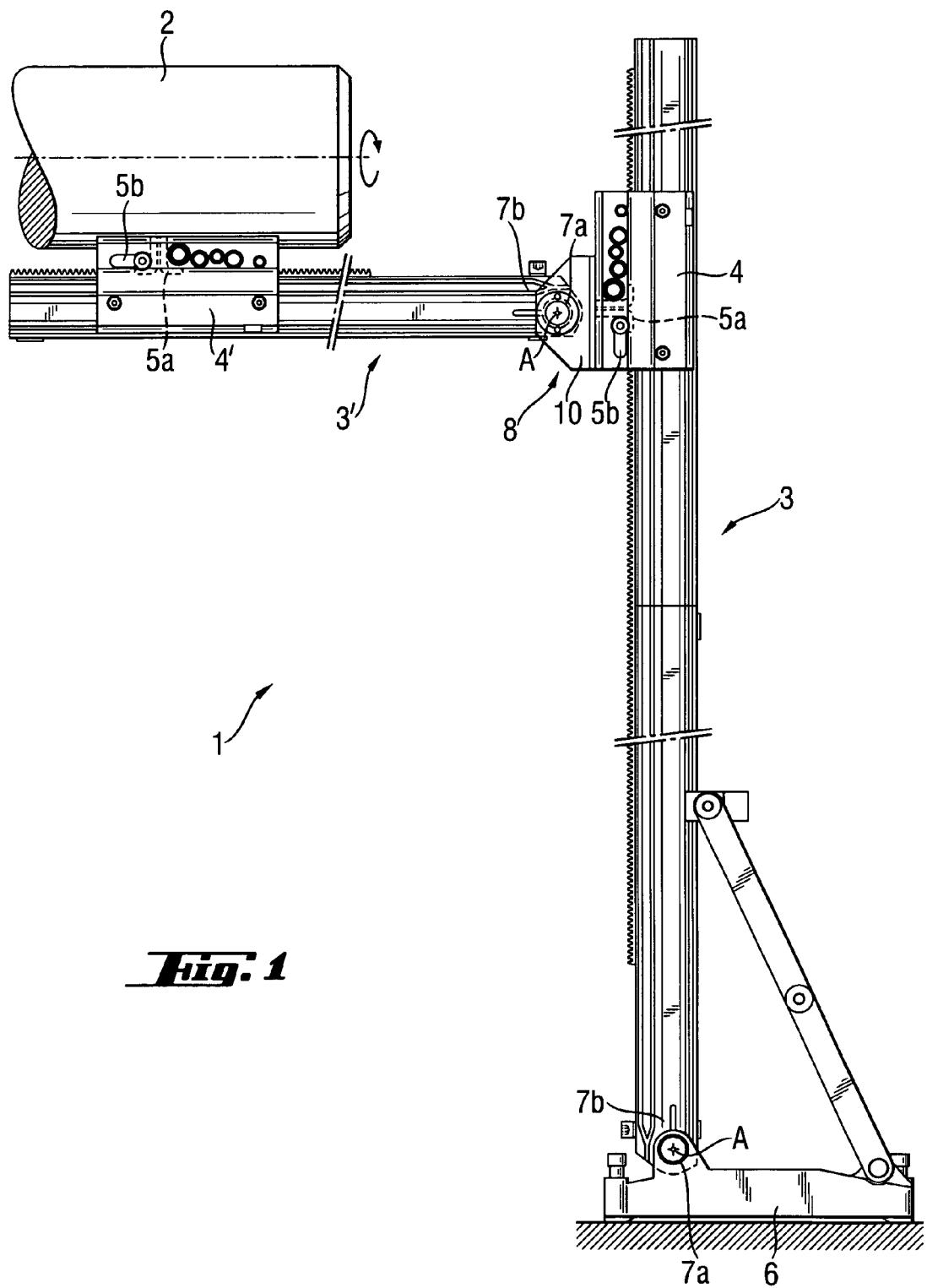
FIG. 1 represents a guide rail system in side view.

According to FIG. 1, a guide rail system 1 for a tool machine 2 shown only in part comprises two axially extending guide rails 3, 3', two guide slides 4, 4' displaceable on the guide rails 3, 3' with a first coupling part 5a for fastening the power tool 2, a base plate 6 with a first rail coupling part 7a and a rail junction 8. The rail junction 8, which is displaceable on one of the guide rails 3 with a further guide slide 4 relative to the other guide rail 3', is centrally connected with the other guide slide 4' via an associated second coupling part 5b. In addition, the first rail coupling part 7a of the rail junction 8 is connected to an associated second rail coupling part 7b of the other guide rail 3'. The rail junction 8 is arranged in the first rail coupling part 7a, which corresponds to the first rail coupling part 7a of the base plate 6, each pivotally displaceable about a pivot axis A.

Figure 2:
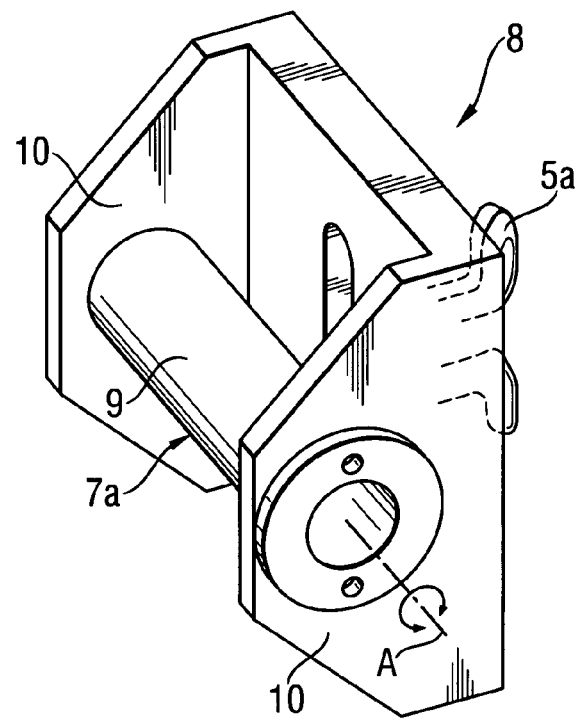
FIG. 2 represents a rail branch in perspective view.

According to FIG. 2, in the case of the rail junction 8 with a hook-shaped first coupling part 5a of the centrally opposing first rail coupling part 7a is configured as a transverse cylinder 9, with its ends inserted into spaced fastening projections 10.

Figure 3:
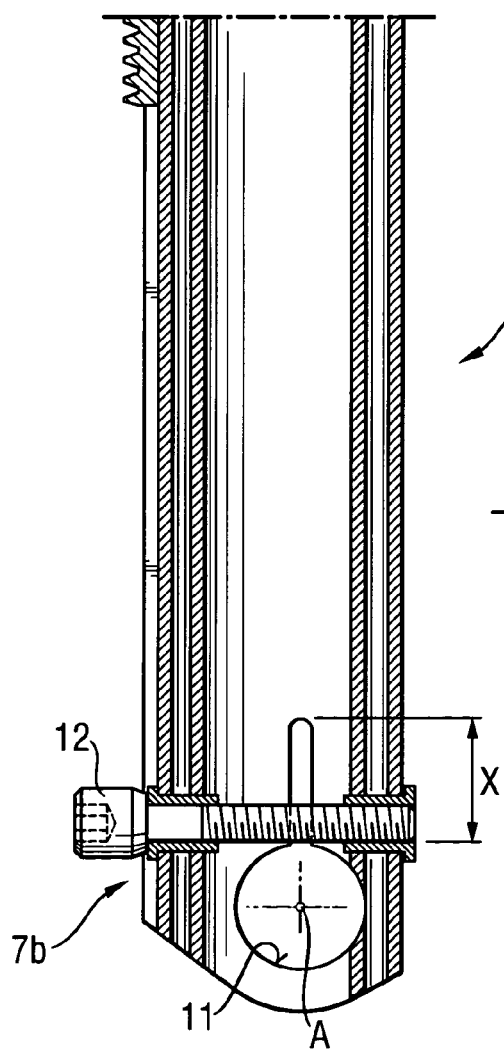
FIG. 3 represents a coupling part of a guide rail in partial longitudinal section.

According to FIG. 3 the second terminally arranged rail coupling part 7b associated with the transverse cylinder 9 of the partially represented guide rail 3 is configured as a slotted transverse cylinder bore situated along the rail, with the cylinder bore being clampable in the slot zone X using a locking screw 12.

The invention claimed is:

1. A guide rail system for a power tool (2) comprising at least two axially extending guide rails (3, 3'), disposed transversely of one another, at least one guide slide (4, 4') displaceable on each of said guide rails (3, 3') including a first tool coupling part (5a, 5b) for fastening the power tool (2) to one of said guide rails (3'), a base plate (6) with a first rail coupling part (7a, 7b) and a rail junction (8) displaceable axially on another one of said guide rails (3) and said rail junction includes a second tool coupling part (5a, 5b) for interconnecting said at least two guide rails (3, 3').

2. A guide rail system, as set forth in claim 1, wherein said rail junction (8) has a second rail coupling part (7a, 7b) for coupling said rail (3) junction (8) to an end of said another one of said guide rail (3).

3. A guide rail system, as set forth in claim 2, wherein said second rail copuling part (7a, 7b) of said junction corresponds to said first rail coupling part of said base plate (6).

4. A guide rail system, as set forth in claim 2, wherein said rail junction (8) is pivotally adjustable on said second rail coupling part (7a, 7b).

5. A guide rail system, as set forth in claim 4, wherein said second rail coupling part comprises a cylinder (9) extending transversely of said guide rails (3, 3a) with opposite ends of said cylinder secured in spaced fastening projections (10).

6. A guide rail system, as set forth in claim 5, wherein first rail coupling part (7a, 7b) at said base plate (6) is formed with a cylinder bore (11) extending transversely of the axial direction of the another one of said guide rail (3) with a slot extending in the axial direction of the another one of said guide rail (3) and is clamped to an axially extending zone (x) by means of locking screw (12).

* * * * *